Sept. 3, 1968  J. C. MOORE  3,399,805
PHONOGRAPH RECORD VENDING DISPENSER
Filed Oct. 26, 1966  4 Sheets-Sheet 1
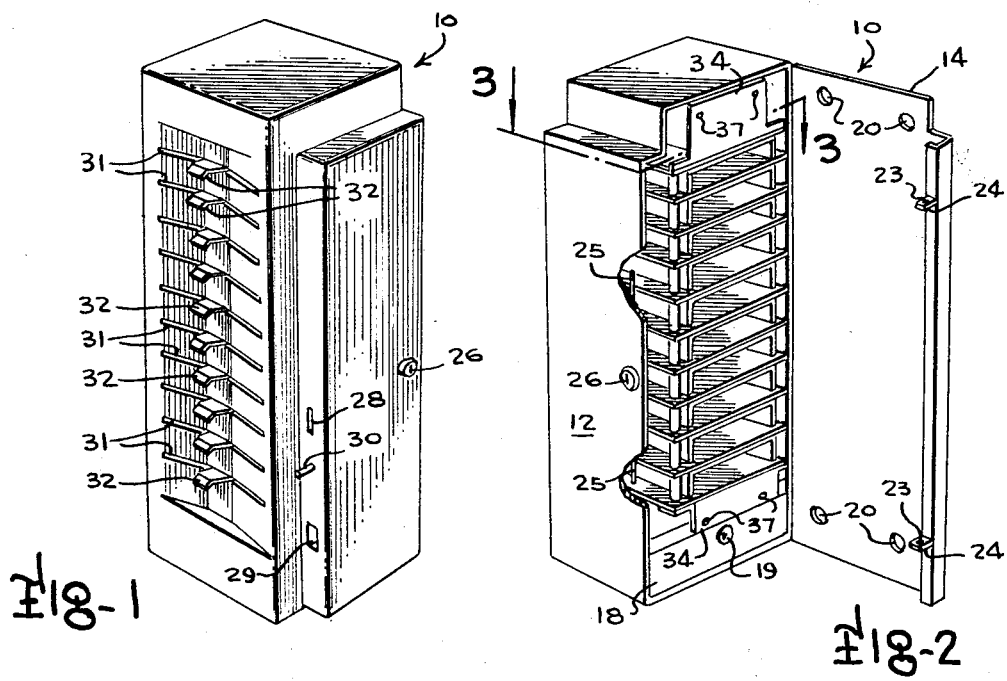
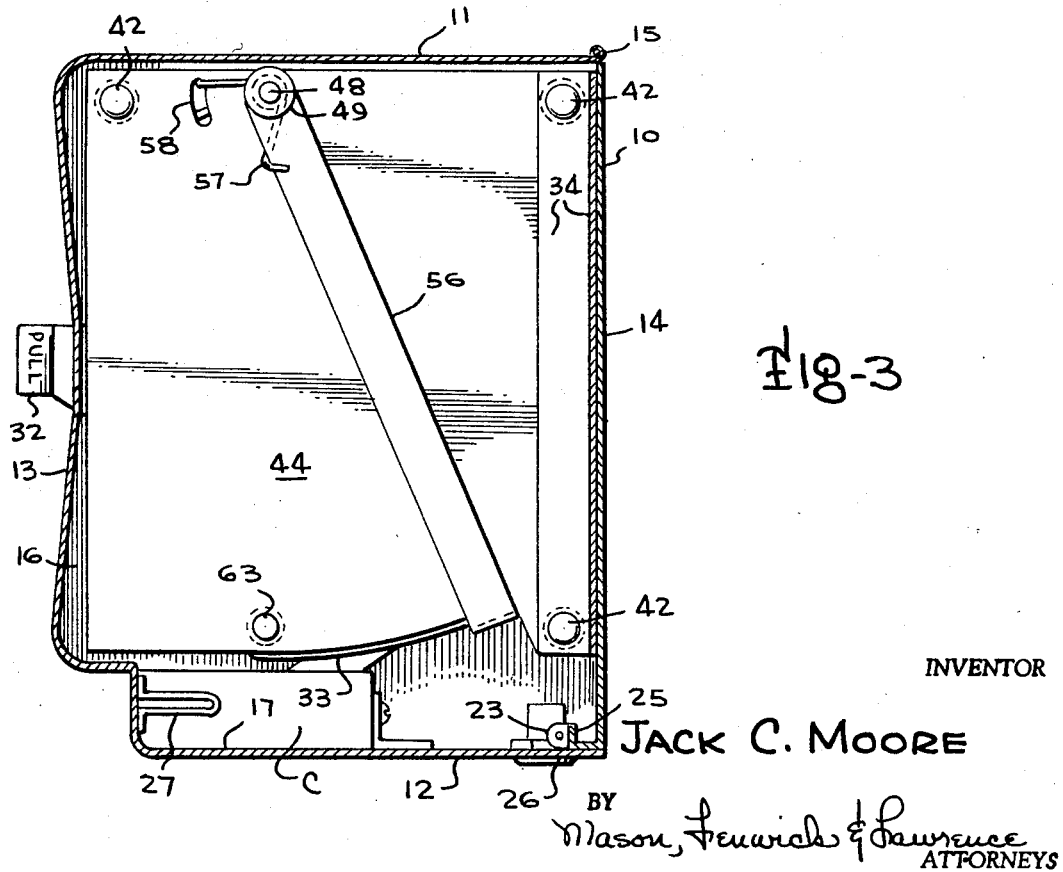
INVENTOR
JACK C. MOORE
BY Mason, Fenwick & Lawrence
ATTORNEYS

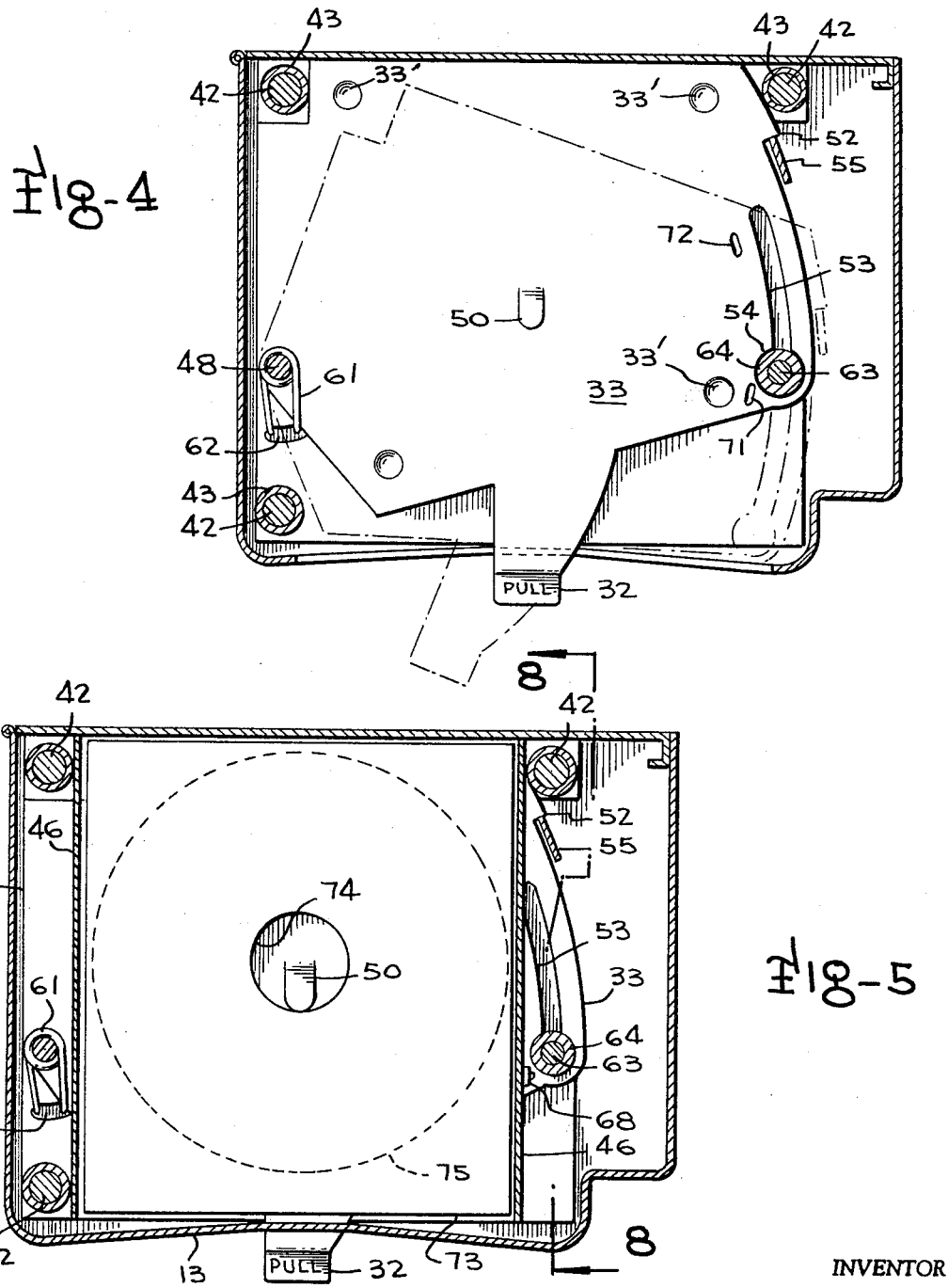

Sept. 3, 1968  J. C. MOORE  3,399,805
PHONOGRAPH RECORD VENDING DISPENSER
Filed Oct. 26, 1966  4 Sheets-Sheet 3
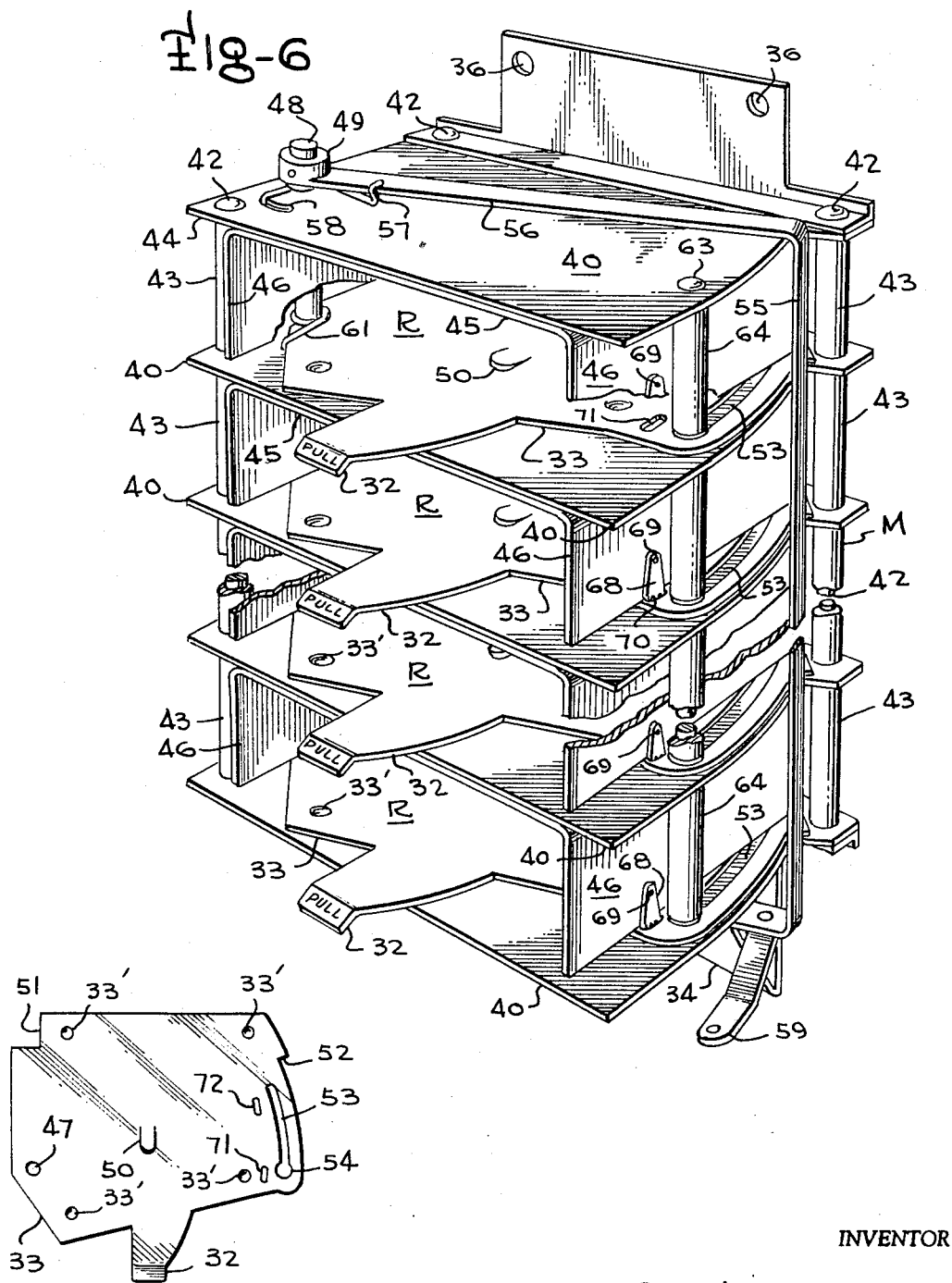
INVENTOR
JACK C. MOORE
BY Mason, Fenwick & Lawrence
ATTORNEYS

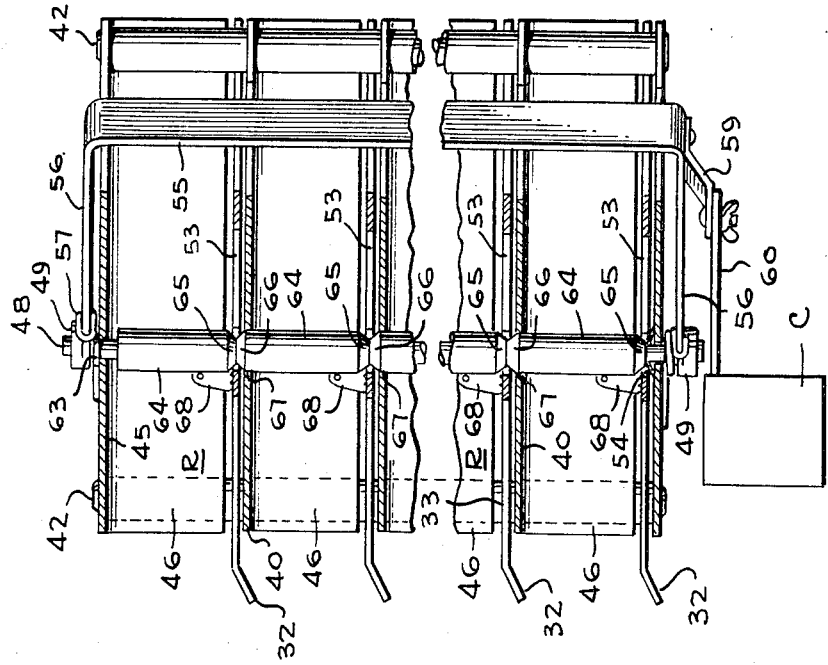
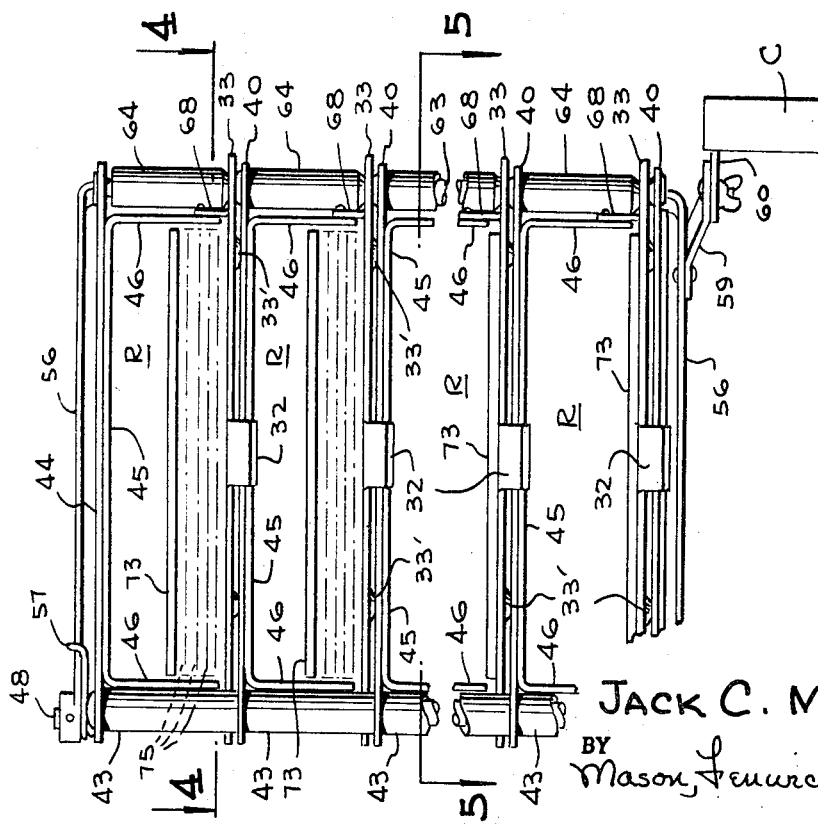

United States Patent Office 3,399,805
Patented Sept. 3, 1968

3,399,805
PHONOGRAPH RECORD VENDING DISPENSER
Jack C. Moore, Freeport, Bahama Islands
Filed Oct. 26, 1966, Ser. No. 589,591
9 Claims. (Cl. 221—119)

ABSTRACT OF THE DISCLOSURE

A phonograph record vending dispenser for records having a plurality of spaced slots for each record to be available for selection with a plurality of spaced storage subassemblies for a plurality of records, with said assemblies being pivotally supported about a vertical axis for dispensing movement in a horizontal plane for dispensing movement of a single record through one of said selected discharge slots and having means responsive to the deposit coinage to cause all of said platforms to move to said dispensing position and lock means for restraining all of the platforms responsive to movement of one of said platforms from its retracted position.

---

The present invention relates to vending dispenser devices for phonograph records, and more particularly to coin released and manually operated devices for storing plural groups of phonograph records, wherein each group comprises plural records of the same recording and the respective groups are of different recordings, and selectively dispensing one record at a time responsive to deposit of a proper coin.

An object of the present invention is the provision of a novel phonograph record vending dispenser, capable of storing a number of groups or sets of plural phonograph records each, and operative responsive to deposit of a predetermined coin to permit withdrawal of one record from any one of the groups chosen by the vendee.

Another object of the present invention is the provision of a coin operated phonograph record vending dispenser, having plural groups of records of different recordings, each group benig made up of plural records of the same recording, stored in vertically aligned relation, wherein manually operable members respectively associated with each group are released responsive to deposit of a coin to permit retraction of one record from the dispenser.

Another object of the present invention is the provision of a novel coin operated phonograph record dispenser having a plurality of similarly constructed modular compartments arranged in vertically stacked fashion, each compartment having a manually operable record support platform pivoted about a common vertical axis and located in the lower portion thereof for supporting a plurality of phonograph records of the same recording in vertically aligned stacked relation thereon, coin operated means for releasing the support platforms for all compartments to render one of the support platforms for any one of the compartments movable by a vendee to withdraw the lowermost record of its supported stack to an exposed position accessible to the vendee, and means responsive to displacement of any one of the platforms from its normal storage position for locking all of the other support platforms against record dispensing movement.

Other objects, advantages, and capabilities of the present invention will become apparent from the following detailed description taken in conjunction with the accompanying drawings illustrating a preferred embodiment of the invention.

In the drawings:

FIGURE 1 is a front perspective view of a coin operated phonograph record dispenser embodying my invention;

FIGURE 2 is a rear perspective view thereof, with the rear cover plate open for service or loading, showing the interior arrangement of the record product compartments;

FIGURE 3 is a horizontal section view, taken along the line 3—3 of FIGURE 2;

FIGURE 4 is a horizontal section view through a section plane immediately above the support platform in the record product compartments, taken along line 4—4 of FIGURE 9;

FIGURE 5 is a horizontal section view through approximately the midplane of an empty product compartment, taken along the line 5—5 of FIGURE 9;

FIGURE 6 is a perspective view of the record product storing mechanism showing overall structural features and arrangement;

FIGURE 7 is a top view of the record support platform;

FIGURE 8 is a view, partly in vertical section and partly in side elevation, of the mechanism of FIGURE 6 illustrating the chamfer cut outs which effect locking of the non-chosen compartments when the support platform for one compartment is being moved to dispense a record; and FIGURE 9 is a front elevation view of the record product storing mechanism of FIGURE 8.

Referring now to the drawings, wherein like reference characters designate corresponding parts throughout the several figures, the phonograph record vending dispensing unit of the present invention is preferably primarily fabricated of sheet metal. The record storage and dispensing mechanism is housed in an exterior sheet metal shell or case 10 of vertically elongated, generally rectangular configuration having sides 11 and 12, a front wall 13 and a rear cover plate 14 hinged, as indicated at 15, to the rearmost edge of side wall 11 to permit the shell or case 10 to be opened for service. The exterior shell or case also has top and bottom walls completing enclosure of the internal mechanism, the top and bottom walls being, for example, reinforced top and bottom plates to insure structural rigidity of the shell 10. The rear cover plate 14 not only serves as an access door to facilitate access to the internal mechanism for service, supply of records, and removal of coins, but serves as the mounting bracket for suspending the shell or case 10 from a wall or flat vertical surface, the cover plate 14 having openings 20 to receive mounting screws for this purpose. A suitable key lock 26 is provided on the side wall 12 adjacent its rear edge, having lock pins 25 to enter locking apertures 24 in lugs 23 projecting forwardly from the recurved lip of the hinged cover plate 14 for locking the case 10 in closed condition.

The internal record supporting and dispensing mechanism, indicated generally by the reference character M, is supported within the case portion formed by front wall 13 and side walls 11, 12, the mechanism M being dimensioned relative to the case to provide spaces 16 and 17 inwardly of the front wall 13 and side wall 12. The space 17 between the mechanism M and wall 12 conveniently accommodates conventional coin acceptor mechanism C and associated coin passage 27 delivering coins from the coin slot 28 to the coin acceptor mechanism C, the mechanism C being of the type having a coin return plunger 30 for releasing coins through coin return chute 29 to the operator, a coin box 18 under control of key lock 19 being disposed in the bottom of the case 10 to receive and collect coins from the mechanism C.

The space 16 is provided to accommodate the inward recessing of the front wall 13 along a generally concave path to facilitate record delivery through the record access slots 31, arranged as a vertically spaced series of transverse horizontal slots, aligned generally with the lower portion of the respective record storage compartments R of the internal mechanism M, through which the records 75 pass in the dispensing operation. Although it will be understood that the record dispenser device may be designed to permit any desired number of different record selections or recordings to be chosen, the herein described illustrative embodiment is designed to permit selection from any of ten different recordings, in which case ten of such access slots 31 and ten record storage compartments R will be provided. A pull handle 32 forming the forward extension of a pivoted horizontal record support platform 33 for each compartment R extends through the slot 31 aligned therewith to an externally accessible position, and is manually activated by pulling forward or outwardly of the case 10 in the dispensing of each individual record product. Support platform 33, of which pull handle 32 is the exterior arm, constitutes the floating floor and record support platform of each record compartment R. As this support platform 33 moves forward when activated, from the front, by the manual pulling of the pull handle 32, it carries a single record on its upper surface forward to and through the record slot 31, where it is manually grasped by the vendee and pulled the rest of the way out of the case 10. As soon as the dispensed record is physically removed from the case 10, and the support platform 33 returns to normal retracted position under force of a return spring 61, another record takes its place, descending, by gravity, into the vacated area in alignment with the slot 31.

The product compartments R are in the form of like modular units or subassemblies stacked in vertically aligned array of the proper number corresponding to the number of different selections to be available, and attached together by means of tie rods 42 and actuation shaft 63, shown best in FIGURE 6, to form the complete record product mechanism assembly M which is maintained in its proper position, within the housing, by top and bottom mounting brackets 34, and supported in correct alignment by set screws 37 (FIGURE 2) attached to the case 10 through the bracket holes 36 in the vertical flanges of brackets 34. The individual record compartment units R, are assembled with a base plate 40, coupled to a second base plate 40 and so on until the entire ten compartments are assembled together, each base plate 40 being separated the required width of the individual record compartment R, by individual spacer collars 43 which enclose the tie rods 42. The tie rods 42 extend from the topmost support plate 44 down through each individual base plate 40, progressing vertically through the tie rod alignment holes, and locking all individual compartments R securely together to form the complete record product mechanism M. Within each individual record compartment R, an inverted U-plate channel 45 is centered and spot welded to the roof, in this case, the underside of each base plate 40 and at the very top, support plate 44. This U-plate channel 45 and its legs 46 define the horizontal width of the record compartment R and constitute the left and right walls of the record compartments R. The record support platform 33 of each modular unit or compartment slidably rests on the base plate 40 of its associated compartment, being supported by slightly depressed dimples 33' adjacent the four corners thereof which bear against the base plates 40, and is fulcrumed for rotation about a common pivot axis defined by the pivot shaft 48 which extends vertically through the base plate 40, of each compartment and the top support 44 and through holes 47 in platforms 33, and has a pivot collar 49 on each end thereof. The actuator shaft 63 also extends through an arcuate slot 53 in the support platform 33 which is of sufficient arcuate length to permit manual activation of the support platform forward and back about the pivot shaft 48 through a range to deliver a record through the slot 31 to a position where it can be grasped and removed by the vendee. The purpose of this support platform 33 is to support the individual record product 75 at rest and to move it forward for dispensing purposes when activated manually.

The support platform 33 has a tang 50 which is slightly upthrust in order to engage only one record at a time for transference from a retracted or rest position within the record compartment, forward to a projected or dispensing position at which point the record is grasped by the vendee and drawn completely out of the case 10. As soon as a record is fully dispensed, another drops into the vacated area by gravity, and resting on the record support platform 33 becomes available for the next dispensing operation. A metal weight 73, which is here shown as square with a circular center opening 74 corresponding to the center openings in the records, is loaded on top of each group of records in each compartment R and functions not only as a weight to hold records firmly in place but acts as an indicator that a record bin is empty in that its vertical thickness is greater than that of the slot 31 so that it will not pass through the record delivery slot 31, and the tab 50 of the support platform 33 abuts the edge of opening 74 and prevents movement of the associated pull handle 32 toward the projected or dispensing position.

The pivot shaft 48, in addition to acting as the fulcrum for the support platform 33 when it swings, also forms the pivot axis for the U-shaped lock bar 55 having lock bar legs 56 attached to the shaft 48 at top and bottom adjacent collars 49. There is a rear corner notch 51 cut out in each support platform 33 which relieves the rear tie rod 42 of obstruction. The lock bar 55 is normally held in a rearmost limit position or locking position illustrated in FIGURES 3 and 6 by a link 59 coupled to a control arm 60 of the coin acceptor mechanism C, the vertical leg of the lock bar 55 in this position abutting a shoulder 52 on the curved edge of each support platform opposite the pivot shaft 48 to prevent outward or dispensing movement of the support platforms 33. When the correct coinage is deposited in the coin acceptor mechanism C, the lock bar 55 is released for one forward-and-return reciprocation cycle, freeing the lock bar 55 to swing forward with the shoulder 52 of any one of the support platforms 33 which may be actuated by pulling on its associated pull handle 32.

Concurrently, with such forward rotation of a selected one of the support platforms 33 toward the dispensing position, the remaining support platforms 33 are interlocked against dispensing movement. This is accomplished by tube spacers 64 which surround the actuator shaft 63 between each vertically spaced pair of support platforms 33. The tube spacers 64 have chamfered or beveled lower ends 65 and upper ends 66, as shown in FIGURE 8, the lower chamfered portion 65 of each tube 64 normally extending into the circular enlargement 54 at the forward end of slot 53 in the support platform 33 of the associated compartment R and the upper chamfered portion 66 extending through the base plate hole 67 in the base plate 40 immediately above the associated compartment R and into the circular enlargement 54 of the slot 53 in the record support platform 33 of the next higher compartment. The circular enlargement 54 in each platform 33 is of the same, or slightly larger diameter than the tubes 64 and the remainder of each slot 53 is of smaller width than the minimum diameter of the chamfered portions 65, 66. It will be apparent that forward movement of any one the record support platforms 33 toward dispensing position causes the lower chamfered portion 65 of the lowermost tube 64, or both the chamfered portions 65 and 66 normally extending into the circular enlargements 54 of the support platforms 33 above the lowermost platform 33, to be displaced axially of the actuator shaft 63 by the action of the edges of the slot 53 of the selected platform 33 as the circular enlargement 54 moves forwardly out of registry with the chamfered portions which were projecting therein and the narrower slot region registers with the tubes 64. The consequent displacement of the tubes 64 upwardly or downwardly securely interlocks the remaining support platforms 33 against dispensing movement, as the chamfered portions of the tubes 64 located in the remaining platforms 33 cannot be displaced from their associated circular enlargements 54 so long as one platform is displaced from normal retracted position.

In such an arrangement wherein both chamfered ends 65, 66 of adjacent tube spacers 64 extend into the enlargements 54, conventional means, such as a slightly bowed spring or a raised formation of the bottom plate 40 with the bottom plate having some slight capacity to deform, are provided to normally support the bottom of the stack of tube spacers 40 and accommodate the required downward movement of those tube spacers below the activated platform 33. Alternatively, the tube spacers 64 may be disposed with their planes of separation aligned with the planes of the lower surfaces of the platforms 33, in which case activation of any one of the platform 33 elevates the tube spacers 64 thereabove to project into the associated enlargements 54 and holds the tube spacers 64 lying therebelow against any elevation out of their associated enlargements 54. The support platform 33, after forward dispensing movement, returns to its normal at-rest position by means of a return spring 61 fastened into an opening 62 in the base plate 40 at the lower side of each record compartment R. The lock bar 55 also returns to its normal at-rest position by means of springs 57 fastened into opening 58 and attached to the extreme end of the upper and lower lock bar legs 56. The lock bar 56 and lock bar return spring 57 are held firmly in position by the pivot bar 48 and collar 49.

Each record compartment R is provided with a small depending pawl 68 pivoted on pin 69 on the outer side of the channel leg 46 nearest the free edge of support platform 33, having a serrated lower edge 70 bearing against the upper surface of the associated platform 33. The pawl 68 is free swinging and normally projects slightly into an aperture or well 71 in the platform 33 which is vertically aligned with the pawl 68 when the platform occupies its normal retracted position. A similar aperture or well 72 is provided in the platform 33 to be aligned vertically with the pawl 68 at the forwardmost limit position of the platform. Thus upon forward dispensing movement of the platform 33, the pawl 68 as it exits from the aperture 71 assumes a slightly rearwardly inclined position with its serrated edge 70 in sliding bearing contact with the upper surface of platform 33 and is operative to catch and hold the platform 33 against return movement should the operator discontinue or accidentally lose control of the platform at an intermediate point in the range of movement thereof. Upon full forward movement of the platform 33, the lower end of the pawl 68 falls into the aperture 72 and assumes a forwardly inclined position during the return stroke of the platform, permitting uninhibited return of the platform under the influence of springs 61 and 57.

To review the overall operation of the herein described device, the records to be dispensed to the purchaser are loaded in the record compartments R, by placing a group of records of one recording, for example, ten of such records, on the support platform 33 of the lowermost compartment R, and placing the metal weight 73 on the top of this stack of records, and similarly placing an equal number of records and a metal weight 73 on the support platform 33 of each of the other compartments R, the record selection in each compartment being different from that in each other compartment. This loading of the records in the record compartment R is easily accomplished from the rear of the case 10 when it is swung to the open position illustrated in FIGURE 2. When a vendee or purchaser desires to obtain a record from the dispensing device, he places the appropriate coinage in the coin slot 28, which descends by the chute 27 into the coin acceptor mechanism C. If the proper coinage was deposited, the coin acceptor releases the lock bar 55 for one forward and return cycle. The vendee then pulls on the pull handle 32 for the record which he desires to purchase, drawing the associated support platform 33 forwardly of the case 10 about the axis of pivot shaft 48, which forward dispensing movement of the support platform 33 carries the lowermost record of the stack of records supported by that platform through the slot 31 to an exposed position where the record can be grasped by the vendee and withdrawn fully from the case 10. The forward dispensing movement of the record is achieved by the upwardly struck tab 50 on the activated support platform 33 which bears against the forwardmost edge portion of the central opening in the record. Such forward dispensing movement of the support platform 33 also carries the locking bar 55 forwardly through its dispensing stroke due to abutment of the shoulder 52 on the moving platform 33 with the vertical member of the lock bar 55. Also as the circular enlargement 54 of the slot 53 in the moving platform 33 is moved forwardly out of register with the interlocking tubes 64, the tubes 64 are jambed upwardly or downwardly, depending upon which platform is actuated, to interlock the remaining platforms against dispensing movement. For example, should the lowermost support platform 33 be activated, movement of the narrower portion of its slot 53 into registry with the interlock tubes 64 jambs the lowermost interlock tube 64 upwardly to project its upper chamfered portion 66 more fully into the circular enlargement 54 of the next support platform 33 immediately above the lowermost support platform, and such upward movement of the lowermost interlock tube 64 similarly shifts each successive interlock tube 64 above the same vertically to similarly interlock the remaining support platforms 33 against forward dispensing movement. The pawl 68 associated with the moving support platform 33 is tilted slightly rearwardly as it leaves the aperture 71 in the moving support platform 33, as previously described, and is operative to hold the shifted platform 33 against return movement until it completes its forward dispensing stroke. When the platform 33 reaches its forwardmost limit position, the vendee releases the pull handle 32, and this platform 33 returns under the influence of the springs 61 and 57 to the retracted position, the pawl 68 having assumed a vertical position upon registry with the aperture 72 in the support platform 33 and then assuming a slightly forwardly inclined position during the return stroke of the platform 33. The lock bar 55 also returns to its retracted position illustrated in FIGURE 3 during the return stroke of the platform 33 and is held against further forward dispensing movement by the coin acceptor mechanism C until another proper coin is deposited in the coin slot 28.

While but one specific embodiment of the invention has been particularly shown and described, it is apparent that various modifications may be made therein, within the spirit and scope of the invention and it is desired, therefore, that only such limitations be placed on the invention as are imposed by the prior art and set forth in the appended claims.

What is claimed is:

1. A phonograph record vending dispenser for storing plural records of each of a plurality of different recordings available for selection by a vendee and conditioned responsive to deposit of proper coinage for dispensing a record of any of the recording choices available to the vendee, comprising a vertically elongated case including a front wall having a plurality of horizontal, vertically spaced record discharge slots therein corresponding to the number of recording choices to be available for selection by the vendee, means defining a plurality of vertically spaced plural record storage stations in said case including a horizontal record supporting platform at the lowermost zone of each said station to support a plurality of vertically stacked and aligned records of the same recording thereon and pivoted about a vertical axis for arcuate dispensing movement in a horizontal plane from a retracted position disposing the records supported thereon wholly within the case to a dispensing position projecting the lowermost record thereon through one of said discharge slots in at least partially exposed relation permitting the record to be grasped and manually withdrawn by the vendee, means on each of said platforms for moving the lowermost record on the platform to said dispensing position during such dispensing movement of the platform, an externally accessible manually operable member for each platform respectively coupled to its associated platform for moving each platform to its dispensing position, means responsive to deposit of proper coinage for releasing all said platforms for movement to said dispensing position, means responsive to displacement of any one of said platforms from said retracted position to restrain all other platforms against dispensing movement wherein said platforms are arranged in vertically aligned relation with their pivot axes forming a common vertical pivot axis adjacent one edge thereof, said platforms having an arcuate free edge portion opposite said pivot axis and concentric therewith terminating in a radially outwardly projecting shoulder spaced rearwardly from a front edge of the platform nearest said front wall a distance correlated with the desired stroke of the platform for dispensing movement of the records, a lock bar member pivotally supported on said common pivot axis having a vertical arm lying immediately adjacent said arcuate free edge portion of each of said platforms abutting said shoulder thereof at a normal position restraining said platforms against movement from said retracted position, and means for restraining said lock bar member at said normal position and responsive to deposit of selected coinage for releasing said lock bar for pivotal movement through one forward and return stroke imparted thereto by said shoulder of one of said platforms during dispensing movement of any selected platform activated by the vendee.

2. A phonograph record dispenser as defined in claim 1, wherein depending pawl means pivoted on a stationary axis is associated with each platform, said pawl means having generally downwardly facing working surface to engage an upwardly facing surface portion of its associated platform which moves in an arcuate path during dispensing movement of the platform, each platform having recesses aligned vertically with said pawl means at the retracted and dispensing limit positions of the platform for receiving the lower end portion of the pawl means therein to permit the latter to assume a vertical position, and said surface portion of said platforms being spaced from said stationary pivot axis a distance less than the radial spacing of said working surface from its stationary pivot axis to cause said pawl means to assume a rearward inclination during dispensing movement of the associated platform and exert a braking action thereon holding the platform against return movement should manual retracting force on the platform be discontinued intermediate said limit positions.

3. A phonograph record vending dispenser device for storing plural records of each of a plurality of different recordings available for selection by a vendee and conditioned responsive to deposit of proper coinage for dispensing a record of any of the recording choices available to the vendee, comprising a vertically elongated case including a front wall having a plurality of horizontal, vertically spaced record discharge slots therein corresponding to the number of recording choices to be available for selection by the vendee, means defining a plurality of vertically spaced plural record storage stations in said case including a horizontal record supporting platform at the lowermost zone of each said station to support a plurality of vertically stacked and aligned records of the same recording thereon and pivoted about a vertical axis for arcuate dispensing movement in a horizontal plane from a retracted position disposing the records supported thereon wholly within the case to a dispensing position projecting the lowermost record thereon through one of said discharge slots in at least partially exposed relation permitting the record to be grasped and manually withdrawn by the vendee, means on each of said platforms for moving the lowermost record on the platform to said dispensing position during such dispensing movement of the platform, an externally accesible manually operable member for each platform respectively coupled to its associated platform for moving each platform to its dispensing position, means responsive to deposit of proper coinage for releasing all said platforms for movement to said dispensing position, means responsive to displacement of any of said platforms from said retracted position to restrain all other platforms against dispensing movement wherein depending pawl means pivoted on a stationary axis is associated with each platform, said pawl means having generally downwardly facing working surface to engage an upwardly facing surface portion of its associated platform which moves in an arcuate path during dispensing movement of the platform, each platform having recesses aligned vertically with said pawl means at the retracted and dispensing limit positions of the platform for receiving the lower end portion of the pawl means therein to permit the latter to move into a vertical position, and said surface portion of said platforms being spaced from said stationary pivot axis a distance less than the radial spacing of said working surface from its stationary pivot axis to cause said pawl means to assume a rearward inclination during dispensing movement of the associated platform and exert a braking action thereon holding the platform against return movement should manual retracting force on the platform be discontinued intermediate said limit positions.

4. A phonograph record vending dispenser as defined in claim 3, wherein said means responsive to displacement of any one platform from said retracted position comprises a second vertical shaft extending through each of said platforms at a location spaced from the pivot axis for said platforms, said platforms each having an arcuate slot therein concentric with said pivot axis having an enlargement at the forward end thereof registering with said second shaft when said platforms occupy said retracted position and the remainder of said slot being of constricted width sized to accommodate said shaft, an axially slidable tube on said second shaft between each successive pair of vertically spaced platforms having beveled upper and lower ends extending into said enlargements when said platform occupies said retracted positions, the beveled ends of said tubes being of greater diameter than the constricted portions of said slots to cause the tubes to be displaced axially by movement of the constricted slot portion into engagement with a beveled end of one of said tubes during movement of any of said platforms toward dispensing position and assume positions in the enlargements of each of the remaining platforms holding them against dispensing movement until the activated platform returns to retracted position.

5. A phonograph record dispenser device for storing plural records of each of a plurality of different recordings available for selection by a vendee and conditioned responsive to deposit of proper coinage for dispensing a record of any of the recording choices available to the vendee, comprising a vertically elongated case including a front wall having a plurality of horizontal, vertically spaced record discharge slots therein corresponding to the number of recording choices to be available for selection by the vendee, means defining a plurality of vertically spaced plural record storage stations in said case including a horizontal record supporting platform at the lowermost zone of each said station to support a plurality of vertically stacked and aligned records of the same recording thereon and pivoted about a vertical axis for arcuate dispensing movement in a horizontal plane from a retracted position disposing the records supported thereon wholly within the case to a dispensing position projecting the lowermost record thereon through one of said discharge slots in at least partially exposed relation permitting the record to be grasped and manually withdrawn by the vendee, means on each of said platforms for moving the lowermost record on the platform to said dispensing position during such dispensing movement of the platform, an externally accessible manually operable member for each platform respectively coupled to its associated platform for moving each platform to its dispensing position, means responsive to deposit of proper coinage for releasing all said platforms for movement to said dispensing position, means responsive to displacement of any one of said platforms from said retracted position to restrain all other platforms against dispensing movement wherein said means responsive to displacement of any one platform from said retracted position comprises a second vertical shaft extending through each of said platforms at a location spaced from the pivot axis for said platforms, said platforms each having an enlargement at the forward end thereof registering with said second shaft when said platforms occupy said retracted position and the remainder of said slot being of constricted width, sized to accommodate said shaft, an axially slidable tube on said second shaft between each successive pair of vertically spaced platforms having beveled upper and lower ends extending into said enlargements when said platform occupies said retracted positions, the beveled ends of said tubes being of greater diameter than the constricted portions of said slots to cause the tubes to be displaced axially by movement of the constricted slot portion into engagement with a beveled end of one of said tubes during movement of any of said platforms toward dispensing position and assume positions in the enlargements of each of the remaining platforms holding them against dispensing movement until the activated platform returns to retracted position.

6. A phonograph record vending dispenser device for storing plural records of each of a plurality of different recordings available for selection by a vendee and conditioned responsive to deposit of proper coinage for dispensing a record of any of the recording choices available to the vendee, comprising a generally rectangular, vertically elongated case including a front wall having a plurality of horizontal, vertically spaced record discharge slots therein corresponding to the number of recording choices to be available for selection by the vendee, a plurality of vertically spaced modular record storage subassemblies assembled in stacked relation in said case each of said subassemblies having vertical and horizontal wall means forming a storage compartment for a plurality of like records of the same recording, a horizontal record supporting platform the bottom of each said compartment to support a plurality of vertically stacked and aligned records of the same recording thereon, a common pivot shaft for pivotally supporting all of said platforms about a vertical axis for arcuate dispensing movement in a horizontal plane extending through a respective one of said discharge slots from a retracted position disposing the records supported thereon wholly within the case to a dispensing position projecting the lowermost record thereon through one of said discharge slots in at least partially exposed relation permitting the record to be grasped and manually withdrawn by the vendee, raised means on each of said platforms extending into the center hole in the lowermost record on the platform for engaging and moving the lowermost record thereon to said dispensing position during such dispensing movement of the platform, said platforms each having an integral pull arm projecting through the associated discharge slot to an externally accessible position for manual movement outwardly of the front wall for moving each platform to its dispensing position, means responsive to deposit of proper coinage for releasing all said platforms for movement to said dispensing position, means responsive to displacement of any one of said platforms from said retracted position to restrain all other platforms against dispensing movement, and said slots each being of a vertical size to accommodate passage of only the associated platform and the lowermost record thereon through the slot during dispensing movement thereon.

7. A phonograph record vending dispenser as claimed in claim 6, wherein said platforms have an arcuate free edge portion opposite said common pivot shaft and concentric therewith terminating in a radially outwardly projecting shoulder spaced rearwardly a selected arcuate distance from a front edge of the platform, a lock bar member pivotally supported on said common pivot shaft having a vertical arm lying immediately adjacent said arcuate free edge portion of each of said platforms abutting said shoulder thereof at a normal position restraining said platforms against movement from said retracted position, and means for restraining said lock bar member at said normal position and responsive to deposit of selected coinage for releasing said lock bar for pivotal movement through one forward and return stroke imparted thereto by said shoulder of one of said platforms during dispensing movement of any selected platform activated by the vendee.

8. A phonograph record vending dispenser as defined in claim 7, wherein said means responsive to displacement of any one platform from said retracted position comprises a second vertical shaft extending through each of said platforms at a location spaced from the pivot axis for said platforms, said platforms each having an arcuate slot therein concentric with said common pivot shaft having an enlargement at the forward end thereof registering with said second shaft when said platforms occupy said retracted position and the remainder of said slot being of constricted width sized to accommodate said shaft, an axially slidable tube on said second shaft between each successive pair of vertically spaced platforms having beveled upper and lower ends extending into said enlargements when said platform occupies said retracted positions, the beveled ends of said tubes being of greater diameter than the constricted portions of said slots to cause the tubes to be displaced axially by movement of the constricted slot portion into engagement with a beveled end of one of said tubes during movement of any of said platforms toward dispensing position and assume positions in the enlargements of each of the remaining platforms holding them against dispensing movement until the activated platform returns to retracted position.

9. A phonograph record dispenser as defined in claim 6, wherein depending pawl means pivoted on a stationary axis is associated with each platform, said pawl means having generally downwardly facing working surface to engage an upwardly facing surface portion of its associated platform which moves in an arcuate path during dispensing movement of the platform, each platform having recesses aligned vertically with said pawl means at the retracted and dispensing limit positions of the platform for receiving the lower end portion of the pawl means therein to permit the latter to assume a vertical position, and said surface portion of said platforms being spaced from said stationary pivot axis a distance less than the radial spacing of said working surface from its stationary pivot axis to cause said pawl means to assume a rearward inclination during dispensing movement of the associated platform and exert a braking action thereon holding the platform against return movement should manual retracting force on the platform be discontinued intermediate said limit positions.

References Cited
UNITED STATES PATENTS

| | | | |
|---|---|---|---|
| 2,305,342 | 12/1942 | Fry | 221—125 |
| 2,427,628 | 9/1947 | Silverman | 221—123 |
| 2,521,227 | 9/1950 | Kelly | 194—2 |
| 2,635,026 | 4/1953 | Kreul | 221—255 |

STANLEY H. TOLLBERG, *Primary Examiner.*